United States Patent
Santos et al.

(10) Patent No.: US 11,443,566 B2
(45) Date of Patent: Sep. 13, 2022

(54) UNIFIED SECURE AUTOMATIC ECU PROVISIONING AND ECU MESSAGE VALIDATION

(71) Applicant: FORD GLOBAL TECHNOLOGIES, LLC, Dearborn, MI (US)

(72) Inventors: Sergio Santos, Pawleys Island, SC (US); Yona Shaposhnik, Oak Park, MI (US); Steven James Craig, Lake Orion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 343 days.

(21) Appl. No.: 16/837,472

(22) Filed: Apr. 1, 2020

(65) Prior Publication Data
US 2021/0312723 A1  Oct. 7, 2021

(51) Int. Cl.
| | | |
|---|---|---|
| G06F 16/28 | (2019.01) | |
| H04W 12/0431 | (2021.01) | |
| G07C 5/00 | (2006.01) | |
| B60R 16/023 | (2006.01) | |

(52) U.S. Cl.
CPC .......... *G07C 5/008* (2013.01); *B60R 16/0231* (2013.01); *G06F 16/284* (2019.01); *H04W 12/0431* (2021.01)

(58) Field of Classification Search
CPC ... G07C 5/008; B60R 16/0231; G06F 16/284; H04W 12/0431; H04W 4/44; H04W 4/50; H04W 12/069; H04W 12/106
See application file for complete search history.

(56) References Cited

U.S. PATENT DOCUMENTS

| | | | |
|---|---|---|---|
| 10,476,679 B2 | 11/2019 | Fynaardt et al. | |
| 2018/0137261 A1 | 5/2018 | Lattin et al. | |
| 2018/0336024 A1* | 11/2018 | Klische | H04L 63/126 |
| 2019/0043271 A1* | 2/2019 | Sandhu | H04L 67/12 |

FOREIGN PATENT DOCUMENTS

WO  WO-2018208777 A1 * 11/2018 ............. G06F 21/44

* cited by examiner

*Primary Examiner* — Mohammed Waliullah
(74) *Attorney, Agent, or Firm* — Michael Spenner; Brooks Kushman P.C.

(57) ABSTRACT

A system includes an electronic control unit (ECU) including a processor that determines that the ECU has been communicably connected to a vehicle communication system. The processor sends a provisioning message, via the communication system, to a remote server, responsive to connection to the vehicle communication system. The message includes a vehicle identifier provided by an element of the vehicle system and signed with a unique security key specific to the ECU. The processor is also receives a confirmation response from the remote server and enables further communication for the ECU responsive to the confirmation response.

12 Claims, 2 Drawing Sheets

UNIFIED SECURE AUTOMATIC ECU PROVISIONING AND ECU MESSAGE VALIDATION

TECHNICAL FIELD

The illustrative embodiments generally relate to methods and apparatuses for unified and secure electric control unit (ECU) provisioning and ECU message validation.

BACKGROUND

To meet modern demands for vehicle connectivity, an increasing number of electronic control units (ECU)s need to be inter-connected and communicate with original equipment manufacturer (OEM) cloud & third-party systems.

Introduction of new ECUs can be complex because of the significant number of acting parts and systems that ECUs need to interconnect to meet functionality and usability requirements. ECUs can also malfunction after having been installed, and malfunctioning ECUs may need to be replaced in such a way that they could interoperate with other components and cloud system after replacement. This leads to an increased amount of engineering effort and costs, as a replacement ECU may not be necessarily immediately compatible with a vehicle simply because its predecessor was.

It is also difficult to know which ECU is assigned to which specific vehicle during assembly. With the volume of ECUs per vehicle and the volume of vehicles assembled by a given OEM, there are not particularly suitable methods to register given ECUs to a specific vehicle during assembly.

Also, attackers may attempt to disrupt a vehicle communication system communicating with the cloud by pretending to be one of the ECUs of the communicating vehicle. This may include trying to capture traffic information from/to ECUs. As a result, there may be significant costs involved in to securing each ECU that contains configurable content, user information, etc.

To avoid malevolent access, ECUs may be identified and protected against intruders while exchanging data with the cloud or while in idling mode. To accomplish that, ECUs utilize a specialized security material known as key certificates. Engineers must consider these factors while integrating new ECUs in vehicle in agile manner. Managing these identities and keys across multiple supplier, manufacturing, and service entities is very complex and costly.

SUMMARY

In a first illustrative embodiment, a system includes an electronic control unit (ECU) including a processor configured to determine that the ECU has been communicably connected to a vehicle communication system. The processor is further configured to send a provisioning message, via the communication system, to a remote server, responsive to connection to the vehicle communication system, the message including a vehicle identifier provided by an element of the vehicle system and signed with a unique security key specific to the ECU. The processor is also configured to receive a confirmation response from the remote server and enable further communication for the ECU responsive to the confirmation response.

In a second illustrative embodiment, a system includes one or more processors configured to receive a provisioning message from a vehicle electronic control unit (ECU), signed by the ECU with a key unique to the ECU. The processors are also configured to check the signature of the provisioning message against a set of stored unique keys, to validate that the message is from a known ECU having the unique key and to determine which ECU the message is from based on the unique key. Further, responsive to validating the signature, the processors are configured to determine a vehicle identifier with which the ECU is to be associated, the vehicle identifier included in a message payload and store a relationship between the ECU and the vehicle identifier in a database such that the ECU is uniquely associated with a specific vehicle identifier.

In a third illustrative embodiment, a computer-implemented method includes receiving a message wherein a vehicle electronic control unit (ECU) is a party to the message. The method also includes validating the message based on information included in the message identifying an ECU and a identifying a vehicle, compared to a predefined relationship associating the ECU with a specific vehicle identifier. The method additionally includes matching the association of the predefined relationship, processing a message payload, responsive to the information included in the message.

DETAILED DESCRIPTION

Figure 1:
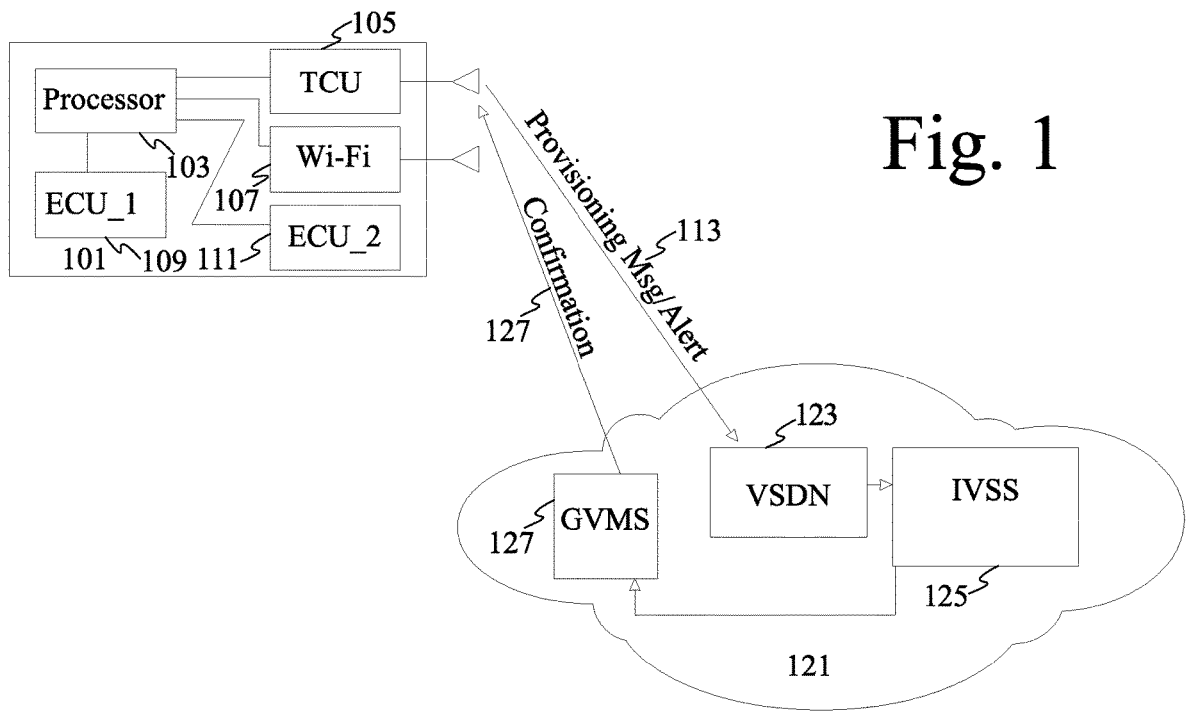
FIG. 1 shows an illustrative example of an ECU reporting system for registering a new ECU to a given vehicle.

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments provide an improved unified method increasing efficiency of and simplifying the process of introducing new ECUs into a vehicle's bill of material in a dynamic way. This can aid in avoiding the need for creating a custom integration solution every time a new ECU needs to be added in such a way that is backward and forward compatible. The embodiments provide solutions that maintain strong and consistent security policies while enabling an OEM to realize both flexibility and efficiency when adding ECUs in OEM-connected vehicles or allowing 3rd party ECUs to be added during and post-assembly.

In addition to adding ECUs to vehicles, this concept can similarly be employed for other hardware additions to vehicles and to products similar to vehicles, or even any product for which developing an inventory of specifically assigned onboard hardware components is desired. This concept could be used for tracking virtually any assignable hardware component and binding it to a vehicle or similar other product for which an inventory of specific parts is desired. Such devices could advertise their state in their attributes within an internet of things (JOT) device and this information could be transferred to the cloud via an ECU or via an onboard communication medium.

Addition of a feature to a vehicle may require a compatibility check with regards to any hardware and/or software installed in the vehicle. If manufacturers can dynamically add features, they can upgrade vehicles even post-sale. If the manufacturer does not know which specific ECUs are installed in a given vehicle, however, evaluating the vehicle for the upgrade can be a difficult task. It could involve software rewrites that ensure compatibility with generally known vehicle traits, or it could result in foregoing the upgrade until a new production year.

As OEMs began adding vehicle ECUs at scale, the OEMs may have required that the ECU manufacturers registered the ECUs in some manner. This was not unified, however, and the result was that registration of ABC ECU could look completely different from registration of DEF ECU. Accordingly, the OEM backend would have to be able to handle both registrations, which could result in failure to validate a registration even if the ECU was otherwise validly registering.

Even within a single OEM, various teams of engineers may want to continue to add features and improve vehicles following delivery. This often requires a knowledge of which vehicles can support the new feature, unless the OEM wants to delay production until the feature is complete. Absent an inventory of ECUs or other identification that provides assurances that a given vehicle is already compatible with the feature, however, these updates may be delayed until a later model.

The illustrative embodiments provide a unified ECU registration and binding process, that allows for unified ECU registration across various part manufacturers who manufacture the ECUs, as well as reverse compatibility if an ECU is added to an already existing vehicle. Further, once registered, the ECUs provide an inventory of specific ECUs bound to a specific VIN, which allows for better understanding of compatibility of a feature-add to the vehicle having the VIN. By knowing which specific ECUs are onboard the vehicle, the OEM can determine, based on hardware and software levels, for example, whether a given vehicle includes the functionality necessary to enact an updated or new feature that is dynamically added to the vehicle post production.

Under the illustrative embodiments, new ECUs installed in vehicle undergo an authentication and self-registration process to allow them to gain access to an application or allow them to communicate remotely with cloud system. The authentication and registration process may require that each new peripheral ECU send its metadata via a unique alert message to a cloud-based system. This may include leveraging a subservice type and a unique identifier embedded in an encrypted payload and signed by a unique key only known by ECU and centralized OEM system.

The signed key may be used to establish the communication with cloud-based system and for the cloud to determine which ECU device is trying to communicate with it. Upon receiving the message, checking payload signature, and descripting the payload with its own security keys, the cloud validates the identity of the ECU against a master database. ECUs having a valid identity are then bound by the cloud which binds an ECU special identifier, that may be unique for that ECU type across a vehicle line, with a vehicle unique VIN number for the vehicle in which the ECU is installed. The YIN can be reported with the alert message, or the vehicle could be identified based on an identifier associated with the alert message, allowing for YIN lookup. This method allows enhanced security while enabling the vehicle ECU device communication with the cloud and its ECU type respectively. If a message comes from a spoofed ECU, there will likely be no correlating VIN associated with the message, thus preventing communication from occurring with the ECU since a mapping to a YIN will not be verifiable.

The ECU or other hardware does not necessarily need to be bound specifically to a YIN, any unique vehicle identifier can be used for this purpose. This could include, for example, a hash of a YIN with another sequence, or other obscure identifier that does not specifically identify (on its face) a vehicle, in the advent of privacy concerns. The VIN itself is simply one example of a unique identifier and use of the binding or other concepts discussed herein is not limit to YIN-binding or other uses of VINs.

Implementation of the illustrative embodiments allows vehicles to self-report hardware modules contained within. This also facilitates earlier diagnostic testing of vehicles capabilities without waiting for vehicle to be fully gate checked at an end-of-assembly line. This enables engineering teams to identify defective ECUs earlier in vehicle production lifecycle to increase OEM quality metrics.

The illustrative embodiments, and the like, also facilitate vehicle part replacement at the service facility and enables retrofitting of exiting vehicle with new ECU that didn't exist during the vehicle build.

In general, the illustrative embodiments may allow for decreased complexity in the backend system having to handle multiple types of vehicles alerts while authenticating a new ECU. The embodiments may allow for decreased code change every time a new ECU device gets implemented in a vehicle platform, may decrease maintenance cost to maintain code in ECUs and on the cloud-side and may reduce the amount of validation required in the cloud system. Moreover, the illustrative embodiments provide a scalable process for whenever a new ECU device gets added into a vehicle, which may result in fewer engineer changes and re-validation. Further, the illustrative embodiments may add additional security and protection against attacker or intruders.

In addition, by automatically associating a specific ECU with a VIN during assembly of a vehicle (e.g., associating an electronic serial number (ESN) of the ECU with the VIN), a complete inventory of ECUs can be built for a vehicle by the time it is sent out for delivery to a dealer. Since the ECUs can also leverage the vehicle modem for communication, the inventory can also be built during actual delivery of the vehicle or at any other suitable point in time. This is an accurate inventory of the specific ECUs installed in a given vehicle, leading to higher security for communication with those ECUs by use of the correlation of an ECU with a VIN.

FIG. 1 shows an illustrative example of an ECU reporting system for registering a new ECU to a given vehicle. In this example, the vehicle 101 includes an onboard processor 103, connected to a remote communication system. The remote communication system can include, for example, a telematics control unit 105, for enabling a cellular connection, or a Wi-Fi transceiver 107, for example, for enabling a connection over a wireless, wide-area network. This connection can be used by a newly installed ECU to report the registration data from the ECU and to allow for registration of the ECU to the given vehicle 101.

In this example, the vehicle 101 includes a plurality of ECUs 109, 111. ECUs are hardware elements and can be physically installed in and removed from a vehicle 101. Further, these ECUs are capable of communication with the cloud, and may include communication credentials and user-centric, configurable data. If a malicious entity could replicate a request on behalf of an ECU, that entity could communicate with the cloud as though it were the ECU, similarly, if the individual could communicate with the ECU as though it were the cloud, the individual could access onboard information. If both sides of communication have the ECU associated with a specific VIN and, for example, communication includes the association, then there is a relative assurance that the communication either came from a known ECU (if the communication originated at a vehicle having the VIN) or came from a trusted source to the ECU (if the communication identified the VIN for the vehicle in which the ECU resides).

When an ECU 109 detects that it has been connected to the vehicle 101, that ECU 109 can use a vehicle communication system 105, 107 to communicate with the cloud 121 and to provision the ECU. The ECU 109 sends an alert message 113 that can include an encrypted payload and a signature known to the ECU and a backend receipt server 123. For example, the message can be signed with a security key assigned to a given ECU and known to the backend server 125. In one nonlimiting example, this key is an advanced encryption standard AES256 key. The payload can also include ECU-specific information, such as an ECU type identifier, VIN, ECU hardware and software levels, etc. The alert 113 is received at the vehicle service delivery network (VSDN) 123 and the VSDN can communicate with the in-vehicle security services (IVSS), which is capable of authenticating the outer wrapper of a double wrapped encrypted message.

The VSDN 123 passes an authenticated alert/message to the IVSS 125, which can then decrypt the payload of the message. The IVSS 125 can both validate the signature provided by the ECU 109 and identify the source of the message (the specific ECU) based on the unique AES256 key or other key. This signature was provided to an ECU manufacturer by the vehicle OEM, and thus both the ECU 109 and the OEM IVSS 125 system know the key. The IVSS 125 also extracts the payload.

Next, the IVSS 125 passes the decrypted payload to the global vehicle management system (GVMS) 127 after validating the message. The GVMS 127 can access a record for each vehicle's VIN, and store an association between the VIN and the ECU 109. The ECU is known based on the unique signature/key associated with the ECU (and thus the message) and the particular VIN is known by being retrieved from the signed payload. This ties the ECU 109 to a specific vehicle 101, and can be useful information for validating the source of communication as previously noted. The GVMS 127 can then send a verification message 129 back to the vehicle 101 for delivery to the ECU 109. The ECU can enable functional communication pertaining to the ECU's intended functions, pursuant to receiving this confirmation message. The system may store the ESN of the ECU in conjunction with the VIN, and the other information included in the payload (or later retrieved), such as hardware/software levels, ECU type, etc. can be cross-referenced with this association.

Figure 2:
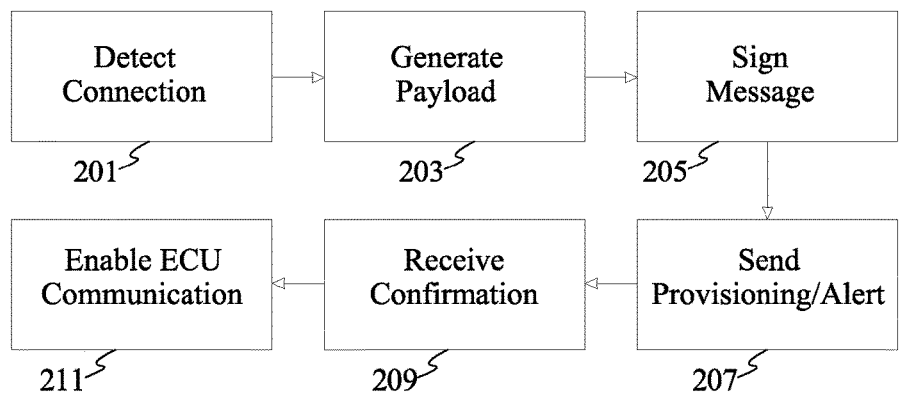
FIG. 2 shows an illustrative vehicle-side registration process for a new ECU.

FIG. 2 shows an illustrative vehicle-side registration process for a new ECU. In this illustrative embodiment, when an ECU 109 is connected to a vehicle 101, the ECU 109 detects the vehicle 101 connection at 201. This can cause the ECU 109 to go into a registration process, whereby the ECU 109 will report to a backend server 127 for eventual affiliation with a vehicle 101 VIN.

The ECU 109 assembles a payload at 203, which can include an ECU type identifier, a VIN, etc. The ECU 109 then signs the payload at 205 and uses a vehicle 101 communication system 105, 107, to communicate with a cloud system at 207 for registering and binding the ECU 109 to the vehicle 101. The communication can include an origin identifier, which is the vehicle 101, and this can be used to correlate the vehicle 101 to the ECU, or the payload may identify the vehicle 101 or a VIN. After the cloud-side processing occurs, during which the ECU is validated and registered with the VIN, the vehicle 101 may receive a response message at 209. This message is passed to the ECU 109, and the ECU 109 can use the confirmation message as the basis to enable regular ECU communication at 211.

Figure 3:
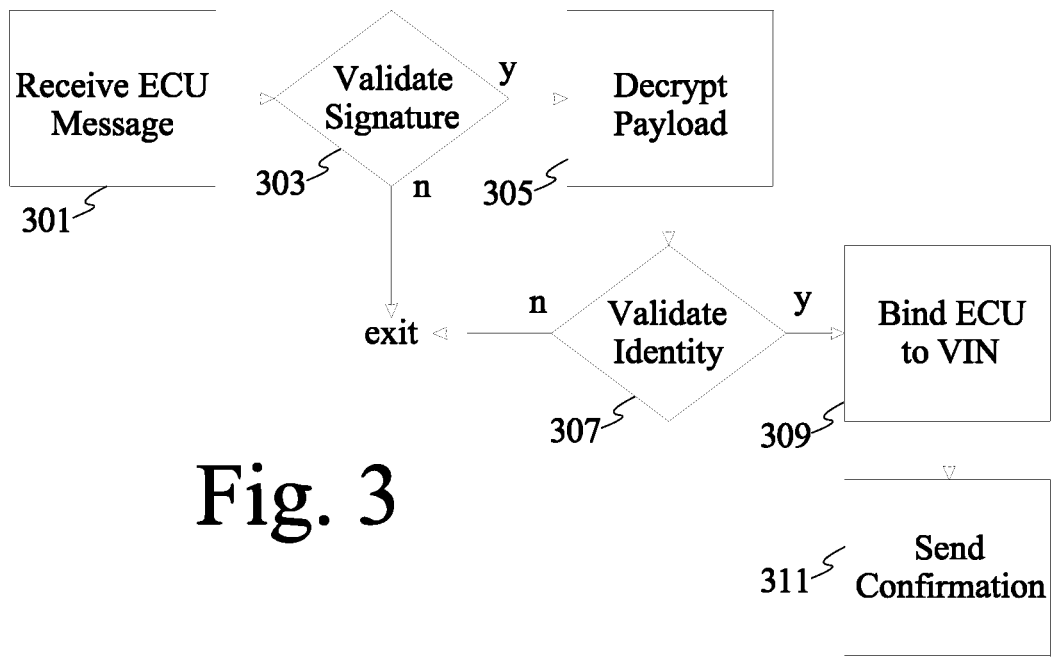
FIG. 3 shows an illustrative cloud-side registration process for a new ECU.

FIG. 3 shows an illustrative cloud-side registration process for a new ECU. This is an example of a process that can occur at one or more cloud-side elements that are remote from the vehicle 101. In this example, the IVSS server 125, for example, receives an ECU alert at 301. This is a signed and encrypted payload in this example, having been signed by the ECU 109 with a code known uniquely to the ECU and the authentication system. Each ECU 109, 111 may be provided with a unique identifier, unique serial number and unique security key, and the signature can be both validated and used to identify the ECU 109 at 303.

The IVSS server 125 may also decrypt the payload, using a decryption key known to the ECU 109 (e.g., known to an ECU manufacturer and provided to the ECU) and known to the OEM IVSS server 125. The payload can contain information used to validate the ECU and vehicle 101 relationship, such as ECU identifiers and or a VIN. Once all validation has occurred, the server 125 or another server such as the GVMS server 127 can establish an association between the ECU 109 and a specific VIN. This binds the ECU 109 to a specific vehicle 101.

If the ECU 109 were ever validly transferred to another vehicle, the registration could occur again and binding to a new vehicle could be established. By having a 1-to-1 relationship between an ECU and the vehicle 101 in which it is installed, it is very difficult to fake a message from or to the ECU unless the person also knows the specific vehicle in which the ECU is installed. Once the ECU is bound to the VIN, the GVMS server 127 can send a confirmation message back to the vehicle 101. This message can be used by the ECU 109 to enable ECU services for that ECU 109.

Figure 4:
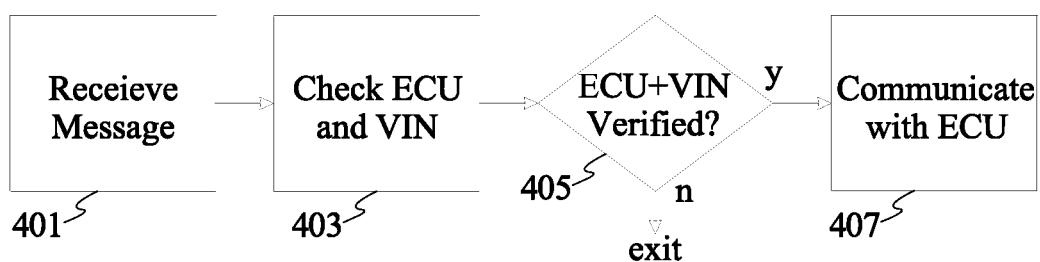
FIG. 4 shows an illustrative communication process utilizing ECU to VIN mapping.

FIG. 4 shows an illustrative communication process utilizing ECU to VIN mapping, which can be used, for example, for verification purposes when a message from the ECU 109 is received. Since the ECU is associated with a unique VIN, only messages that include both an ECU 109 identifier and an expected VIN will be assumed to have validly come from the ECU 109.

In this example, a remote system, such as the VSDN 123, receives a message from the ECU at 401. This message may be encrypted and may be signed with both and ECU 109 identifier and a vehicle 101 VIN or other unique vehicle identification associated with the ECU in a predefined manner such as described herein above. The remote system accesses a stored correlation of ECUs to VINs, to determine if the ECU 109 identified in the message has a predefined relationship with the VIN or other vehicle identifier at 403.

If the relationship exists at 405, the message is verified as coming from the ECU known to be installed in the vehicle having the VIN. If a malicious entity were spoofing a message from the ECU, the entity would have to know both the ECU identifier and the specific VIN correlated to the ECU. Once the message source has been verified as the ECU associated with the VIN and installed in the vehicle 101 having the VIN, the system can then communicate with the ECU at 407, having assurances that the ECU is the expected ECU and not a malicious attacker.

In a similar manner, messages to the ECU 109 must include both the ECU identifier and an appropriate VIN. The vehicle 101 can receive messages addressed to an ECU 109 installed in the vehicle 101, but the message header may also include a VIN. If the message header does not include the VIN, or if the VIN does not correspond to the vehicle 101, the vehicle 101 may reject the message, as a valid sender should know the relationship between the ECU and VIN and easily be able to provide both identifiers. An OEM can maintain the list of relationships and provide access to any valid system or service that needs to send approved messages to the ECU. Other entities will find it difficult to guess both the ECU identifier and a corresponding VIN, in addition to other security measures that may be provided.

In at least one embodiment, a centralized OEM Cloud system securely in a hardware security mobile (HSM) application, generates identifier range of new ECUs and a corresponding security key (such as, but not limited to, an AES256 key) to be securely distributed to an ECU supplier. This makes it possible to securely and dynamically tie ECU to specific vehicle during vehicle manufacturing ECU replacement service by receiving a message signed by the key, which uniquely correlates to a specific ECU, and then the specific ECU can be tied to a VIN included in the payload.

Through use of the illustrative embodiments, messaging to and from vehicle ECUs can realize improved security and assurances that messages to and/or from the ECUs are valid and sent from the actual ECU or from a valid sender who knows the vehicle and ECU relationship as predefined when the ECU is installed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
one or more hardware processors configured to:
receive a provisioning message from a vehicle electronic control unit (ECU), the provisioning message having a signature from being signed by the ECU with a key unique to the ECU;
check the signature of the provisioning message against a set of stored unique keys, to validate that the message is from a known ECU having the unique key and to determine which ECU the message is from based on the unique key;
responsive to validating the signature, determine a vehicle identifier with which the ECU is to be associated, the vehicle identifier included in a message payload;
store a relationship between the ECU and the vehicle identifier in a database such that the ECU is uniquely associated with a specific vehicle identifier;
receive an alert message from the ECU, the message signed by the ECU with the unique key and including a vehicle identifier in a payload;
based on the signature, validate the message and identify the ECU;
extract the vehicle identifier from the payload of the message, responsive to validating and identifying the ECU;
determine if the identified ECU has an existing stored relationship with the vehicle identifier based on information in the database; and
validate the message based on the identified ECU having the existing stored relationship with the vehicle identifier as indicated in the database.

2. The system of claim 1, wherein the vehicle identifier includes a vehicle identification number (VIN).

3. The system of claim 1, wherein the payload includes an ECU hardware level or ECU software level.

4. The system of claim 3, wherein the relationship between the ECU and vehicle identifier is further cross-referenced with ECU characteristics of the ECU, including at least one of the hardware level or software level.

5. The system of claim 1, wherein the hardware processors are further configured to send a confirmation message to the ECU, responsive to storing the relationship.

6. The system of claim 5, wherein the confirmation message includes the vehicle identifier identified in the relationship stored by the storing.

7. A method comprising:
- receiving a provisioning message from a vehicle electronic control unit (ECU), the provisioning message having a signature from being signed by the ECU with a key unique to the ECU;
- checking the signature of the provisioning message against a set of stored unique keys, to validate that the message is from a known ECU having the unique key and to determine which ECU the message is from based on the unique key;
- responsive to validating the signature, determining a vehicle identifier with which the ECU is to be associated, the vehicle identifier included in a message payload;
- storing a relationship between the ECU and the vehicle identifier in a database such that the ECU is uniquely associated with a specific vehicle identifier;
- receiving an alert message from the ECU, the message signed by the ECU with the unique key and including a vehicle identifier in a payload;
- based on the signature, validating the message and identify the ECU;
- extracting the vehicle identifier from the payload of the message, responsive to validating and identifying the ECU;
- determining if the identified ECU has an existing stored relationship with the vehicle identifier based on information in the database; and
- validating the message based on the identified ECU having the existing stored relationship with the vehicle identifier as indicated in the database.

8. The system of claim 7, wherein the vehicle identifier includes a vehicle identification number (YIN).

9. The system of claim 7, wherein the payload includes an ECU hardware level or ECU software level.

10. The system of claim 9, wherein the relationship between the ECU and vehicle identifier is further cross-referenced with ECU characteristics of the ECU, including at least one of the hardware level or software level.

11. The system of claim 7, wherein the processors are further configured to send a confirmation message to the ECU, responsive to storing the relationship.

12. The system of claim 11, wherein the confirmation message includes the vehicle identifier identified in the relationship stored by the storing.

* * * * *